United States Patent

[11] 3,542,352

[72] Inventors Nickolas J. Themelis
Beaconsfield, Quebec;
Paul Spira, Montreal, Quebec, Canada
[21] Appl. No. 794,833
[22] Filed Sept. 23, 1968
Division of Ser. No. 423,257, now
Patent No. 3,437,475, dated Apr. 8, 1969
[45] Patented Nov. 24, 1970
[73] Assignee Noranda Mines, Limited
Toronto, Ontario, Canada
[32] Priority Nov. 23, 1964
[33] Canada
[31] 917,049

[54] APPARATUS FOR THE CONTINUOUS SMELTING AND CONVERTING OF COPPER CONCENTRATES TO METALLIC COPPER
6 Claims, 2 Drawing Figs.

[52] U.S. Cl....................................................... 266/36, 263/33
[51] Int. Cl........................................................ C21c 5/50; F27b 7/06
[50] Field of Search............................................ 75/73, 30, 34, 40, 51, 74, 75; 266/11, 35, 36R, 18, 34; 263/33

[56] References Cited
UNITED STATES PATENTS
2,034,071 3/1936 Wickland..................... 266/11X
2,438,911 4/1948 Gronningsaeter............ 266/11X
3,326,671 6/1967 Worner......................... 75/73X Primary Examiner—J. Spencer Overholser
Assistant Examiner—John E. Roethel
Attorney—Cushman, Darby & Cushman ABSTRACT: Apparatus is provided for a continuous process for smelting and converting copper concentrates to metallic copper and cleaning the slag resulting therefrom. The apparatus comprises a generally horizontally disposed furnace including a smelting zone, a converting zone and a slag-settling zone; means for rotating the furnace about its longitudinal axis; a charging port formed in said furnace; means for introducing an oxidizing gas into the furnace; and wherein the means is shaped and dimensioned to ensure the introduction of a sufficient volume of oxidizing gas to effect gradual oxidation of the matte and subsequent conversion to metallic copper; a copper-settling section provided in the base area of the furnace; an area of the furnace which is remote from the charging port being shaped to form a reducing section for slag resulting from the process; and discharge ports for the copper and slag.

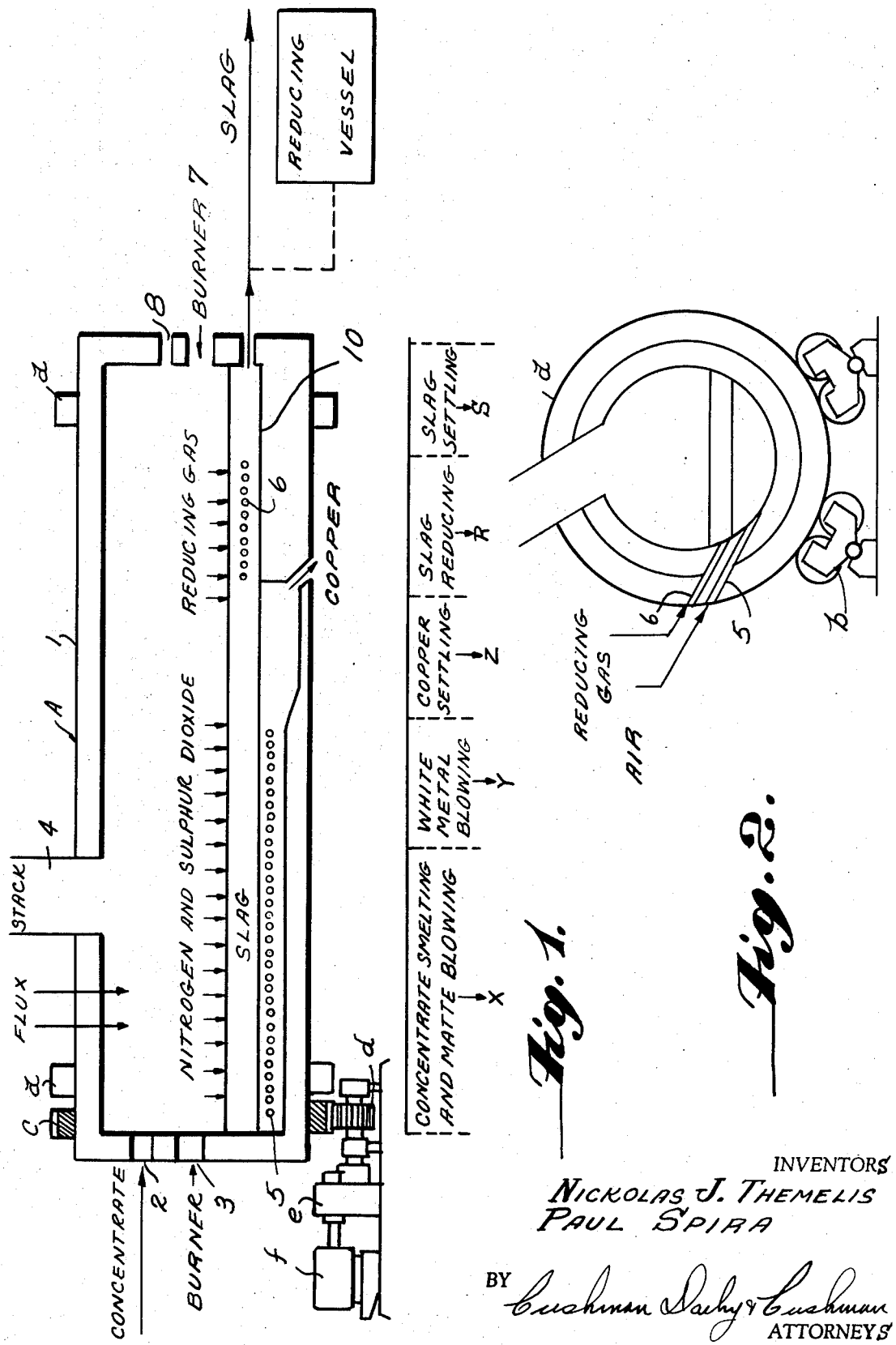

APPARATUS FOR THE CONTINUOUS SMELTING AND CONVERTING OF COPPER CONCENTRATES TO METALLIC COPPER

This is a division of U.S. Pat. application Ser. No. 423,257, filed Jan. 4, 1965, now U.S. Pat. No. 3,437,475.

This invention relates broadly to the smelting and conversion of copper concentrates to metallic copper. More particularly, the invention is directed to a process and apparatus for the continuous smelting and conversion of copper concentrates to metallic copper.

The invention described herein is intended to replace the conventional batch-blowing smelting process (which will be described hereafter for purposes of comparison) by a continuous copper reduction process such that the smelting and converting stages occur partly simultaneously and partly in sequence in a single reactor vessel in which the concentrates are introduced continuously at one end, while the slag and copper metal are removed continuously at the other end of the vessel.

The process of the present invention also includes the treatment of slag by reducing gases or other means with the purpose of decreasing the copper content to an acceptable level, either in an appropriate extension of the reduction reactor or in a separate vessel adjacent to the reactor, such that the slag can flow by gravity from the reactor vessel to the settling vessel.

In addition the invention embodies the treatment of the produced copper to anode copper "on stream" first by oxidizing and then by reducing gases either in an appropriate extension of the reactor proper or in one or more holding furnaces heated by induction or other means.

The invention therefore comprises the continuous smelting converting and reducing of copper concentrates and subsequent treatment of the copper and slag streams which, due to the continuity of the process, occupy a small volume per unit time and may therefore be treated "on stream" to produce a relatively copper-clean slag stream and a copper stream suitable for anode casting.

The invention also utilizes certain aspects of present-day copper technology, in conjunction with new concepts of "on stream" gas-liquid processing which are up to the present time used mostly in chemical processing. The invention also includes the concept of removing copper from molten silicates by subjecting the slags to contact with highly reducing atmospheres and allowing the reduced copper to settle out of the slag.

It is known that for many years considerable thought and effort has been directed to the formulation of means for continuously converting copper concentrates but so far no satisfactory or commercially workable process has been developed. By way of explanation and comparison it may be noted that the conventional noncontinuous or batch copper smelting and converting process involves melting of the concentrates and flux in a reverberatory or blast furnace wherein two separate layers are formed—a heavier one of matte ($Cu_2S$-$FeS$) and supernatant layer of slag. The supernatant layer is allowed to settle and is cleaned of most of its copper content. The matte from the reverberatory furnace is then conveyed to the converter vessel where it is subjected to two-stage air-oxidation reaction. In the first stage of the converting reaction, oxygen reacts with FeS as follows:

$$FeS + 1\tfrac{1}{2}O_2 \rightleftharpoons FeO + SO_2 \qquad (1)$$

Any $Cu_2S$ which may be oxidized to $Cu_2O$ reacts immediately with FeS according to:

$$Cu_2O + FeS \rightleftharpoons Cu_2S + FeO \qquad (2)$$

Silica flux is added to the converter continuously to form iron silicate slag with the FeO produced by reactions (1) and (2):

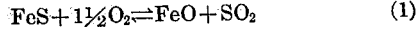

$$2FeO + SiO_2 \rightleftharpoons 2FeO \cdot SiO_2 \qquad (3)$$

The slag produced in the first stage of air-blow is then skimmed from the converter and transferred to the reverberatory furnace where mixing and interaction with the furnace bath lowers its copper content from 2—3 percent Cu to about 0.35 percent in the reverberatory slag.

The $Cu_2S$ (white metal) which has remained in the converter is then subjected to a second blow which is believed to result in the following reactions:

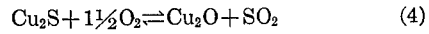

$$Cu_2S + 1\tfrac{1}{2}O_2 \rightleftharpoons Cu_2O + SO_2 \qquad (4)$$

and

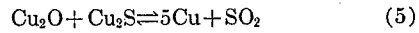

$$Cu_2O + Cu_2S \rightleftharpoons 5Cu + SO_2 \qquad (5)$$

with the net result of producing metallic copper.

There are technical problems which have prevented the earlier development of a continuous converting process. For example, the thermodynamics of copper conversion require that the process be carried out in two steps or stages. The first stage involves oxidation of FeS and the second oxidation of $Cu_2S$ to Cu. It had previously been concluded that the batch operation of the converter lends itself best to these reactions. In addition, it had been found that during the second stage of the process involving conversion of $Cu_2S$ to Cu what may be termed the end point of the conversion was frequently overstepped and a certain amount of copper oxidized as $Cu_2O$. This $Cu_2O$ dissolves in any slag which may be present in the converter at the time.

Therefore, it had been considered that in order to keep the amount of copper in converter slags relatively low it was necessary to have very little or no slag during the second blow. This is a requirement which has been avoided by the present continuous process where the slag from the first stage or blow is present during the second blow.

The need for an efficiently operating process and apparatus for continuously smelting and converting copper concentrates to metallic copper is therefore apparent. The broad object of the invention is to fill this need.

According to the invention a process and apparatus for the continuous smelting and converting of copper concentrates to metallic copper in a single furnace involving a gradual and sequential reaction along the length of said furnace includes the steps of (a) feeding flux and the concentrates to be converted into said furnace; (b) smelting the concentrates and flux; (c) controlling the resultant flow of matte and slag in the furnace as it flows towards tapping ports formed therein; (d) introducing an oxidizing gas into the matte sufficient to effect a gradual oxidation of the ferrous sulphide; (e) continuing to introduce said oxidizing gas into the resultant white metal in a volume sufficient to effect the gradual oxidation of the copper sulphide to metallic copper; (f) allowing the copper to settle and thereafter (g) drawing off metallic copper.

FIG. 1 is a side view of a generally horizontally disposed reaction vessel of the present invention.

FIG. 2 is an end view of the vessel of FIG. 1.

In FIG. 1 of the drawings the vessel designated generally at A has an outer casing 1. A charging port 2 is formed in the casing 1 for the introduction of the concentrates to be reduced. A burner 3, which may be conventional in structure and operation, is also located at the charging end of the vessel. An exhaust stack 4 is provided in the normally upper portion of the vessel. It will be noted that the horizontal length of the vessel is divided up into distinct reaction zones. Firstly, there is the zone for concentrate smelting and matte blowing X, secondly a zone Y where white metal blowing takes place, thirdly the copper settling zone Z and finally the slag reduction zone R and settling zone S at the discharge end of the vessel. It should be noted, however, that the separation of these zones is only broadly indicated. They are not separate and distinct reaction zones in the sense of being physically divided by partitions or the like. Tuyeres 5 are located along the length of the vessel as illustrated. These tuyeres provide for the continuous introduction of air to ensure that the continuous aspect of the process is accomplished. Inlet means for a reducing gas is shown at FIG. 2 at 6. The additional heat required in the slag settling zone may be provided by means of either burner 7 or by supplying a sufficient amount of air through inlet 8 to burn off the excess reducing gas emerging from the slag layer. The furnace may be rotated about its longitudinal axis by any conventional means, a suitable means may consist of riding rings $a$ resting on rollers $b$ and a ring gear $c$ driven by a gear $d$ connected through a speed reducer $e$ to a motor $f$.

Although the present process is continuous, a gradual and sequential reaction is maintained from the first to the second stage of blowing. This is achieved by controlled flow and oxidation of the liquid matte stream as it moves from the feeding end of the furnace towards the tapping end thereof.

Thus, the transition from the first stage involving FeS oxidation to the second stage involving $Cu_2S$ oxidation is not sudden—as it is in the presently used batch operation processes——but rather it is a gradual transition; the FeS is slowly oxidized out of the matte until it reaches the second section of the furnace where only $Cu_2S$ is present.

The invention is not limited to any particular or critical shape or size of reactor vessel or equipment and can also be applied to other types of liquid-gas reactions at high temperatures such as certain other sulphides. The following specific example is given of copper production and the continuous method of the present invention and should be considered in the light of the drawings.

PRODUCTION OF COPPER

Basis: 200 tons of copper produced/day
Material balance:
  Wet concentrates—32.1 tons/hr.
    Assumed composition.—26% Cu; 30% Fe; 33% S; 4% $SiO_2$; 7% $H_2O$.
  Tons of matte produced (29% Cu)—28.6 tons/hr.
    Volume of matte (S.G.=4.1)—225 cu. ft./hr.
  Flux addition—7.5 tons $SiO_2$/hr.
  Tons of slag produced: 22.6 tons/hr.
    Composition—45% Fe (58% FeO); 30% $SiO_2$; 12% $Al_2O_3$, ZnO, etc.
    Volume of slag (s.g.=3.6)=202 cu. ft./hr.
  Tons of white metal ($Cu_2S$) produced—10.45 tons/hr.
    Volume (e.g.=5.9)—56.8 cu. ft./hr.
  Tons of metallic copper produced—8.35 tons/hr.
    Volume (s.g.=8)—33.5 cu. ft./hr.
  Air requirements:
    (a) First stage blow:
      FeS to FeO at 95% oxygen utilization—15,500 c.f.m. air.

Volume of air per 2-inch tuyere—250 c.f.m. of air.
      (Present operation practice—500 c.f.m.)
      Number of tuyeres required—62.
      Length of reactor required (at 6-inch centres for tuyere as present operating practice)—32 ft.
    (b) Second stage blow:
      $Cu_2S$ to Cu at 95% oxygen utilization—4,000 c.f.m. of air.
      Number of tuyeres—16.
      Length of reactor required (6-inch centres)—9 ft.

Residence Times of Materials in Reactor

The reactor vessel A may be very similar in design to the conventional Peirce-Smith converter. Therefore, full conversion will be achieved in the same length of time as obtained in present batch operation. Consequently, the residence time of material is considered to be about 2 hours in the first-stage flow zone X and approximately 0.5 hours in the second-stage blow zone Y. In addition, a residence time of about 1 hour is undertaken for the settling of copper in zone Z and about 0.5 hours for the reducing blow in the slag and 1 hour for the settling of the slag in zone S. The latter figure has been based on experiments on the effect of settling on copper slags. As indicated there are no separate blows as such but rather separate reactions or stages in the process resulting from the continuous blowing and introduction of air through the tuyeres 5.

For the specific example described, on the basis of the above volumetric flows of materials and the estimated residence times, the desired length and internal diameter of the reactor vessel have been calculated as 60 feet and 11 feet respectively.

The above residence time figures have been based on pilot plant studies and also information from present operating practice.

Heat Balance (Per hour of operation):

| | B.t.u./hr. |
|---|---|
| (a) Matte-blowing zone: | |
| Heat content of liquid matte at 2,200° F | 22,500,000 |
| Heat content of liquid slag at 2,200° F. (including 10 tons/hr. of flux) | 29,400,000 |
| Heat content of air input at 2,200° F | 40,900,000 |
| Heat content of water vapour at 2,200° F | 9,700,000 |
| Heat losses (operating experience, 30 ft. converter) | 6,000,000 |
| Total Heat required | 107,600,000 |
| Heat available from FeS reaction and formation of silicate slag | 76,500,000 |
| Auxiliary heat supply at feeding end of reactor (e.g. 3 tons of coal at 42% available heat) | 31,100,000 |
| Total available heat | 107,600,000 |
| (b) White metal-blowing zone: | |
| Heat content of added silica flux (2.5 tons) at 2,200° F | 3,000,000 |
| Heat content of air at 2,200° F | 10,000,000 |
| Heat losses | 1,500,000 |
| Total heat required | 14,500,000 |
| Heat of $Cu_2S$ reaction with oxygen (860 B.t.u./lb. Cu) | 14,500,000 |
| Therefore, total available heat | 14,500,000 |
| (c) Copper-settling, slag-reducing, and slag-settling zones (estimated total length required: 30 ft.): | |
| Heat content of reducing gas (55 c.f.m. of natural gas) | 500,000 |
| Heat losses | 6,000,000 |
| Total heat required | 6,500,000 |
| Auxiliary heat source (burner on tapping end of reactor, 230 c.f.m. of natural gas at 50% available heat) | 6,500,000 |
| Total fuel to process: | |
| 3 tons of coal×24,000,000 | 72,000,000 |
| 285 c.f.m.×60×1,000 | 17,100,000 |
| | 89,100,000 |

A description of process may now be considered with reference to specific example earlier discussed.

The wet (or dry) concentrates are premixed with the required proportion of the silica flux and fed into the front end of the bath of the reactor vessel A by means of any suitable feeding mechanism such as a vibrating screw feeder, a belt feeder, a Garr gun or the like. Experiments have shown that when the concentrates reach a temperature of about 1,000-1100°F., reaction with the airstream from tuyeres 5 commences and the exothermic heat of reaction brings the concentrates to the smelting and converting temperatures.

The heat balance has shown that most of the required heat in the reactor is supplied by the exothermic heat of the converting reactions. An additional heat supply in the form of a gas, oil, or coal burner may be located at the feeding or charging end of the reactor.

The reactor vessel A comprises a cylindrical vessel of about 11 feet in internal diameter and 60 feet length and may be of a construction similar to a Peirce-Smith converter with the exception of the raised hearth 10 at the tapping end which allows the separation of the slag and white metal layers. Tuyeres 5 continuously discharging 250 c.f.m. each are located at 6-inch centres along zones X and Y of the reactor length. As in the conventional Peirce-Smith design, the reaction vessel can be rotated up to 90° so as to expose the tuyeres, in the case of interruption of airflow. It must be visualized that raw materials are fed continuously and molten slag and copper are withdrawn continuously from the reactor furnace. Consequently, materials flow by gravity slowly past any particular point in the reactor (from left to right on FIG. 1 of the drawing).

As the concentrates melt, two layers are formed, one of slag and the other of matte, just as in the conventional reverberatory furnace. However, as the matte layer flows toward the discharge end 7 of the vessel A, it is continuously subjected to reaction with an airstream injected through the tuyeres, by continuous introduction of air. In practice a minimum of about 10 p.s.i. will be used. It is not intended to suggest that absolute continuity of an introduction is essential. Some small stoppage in air introduction is not critical but the continuous aspect of an introduction is to be distinguished from the separate air blows used in the batch process of the prior art. This interaction primarily oxidizes the ferrous sulphide content of the matte to ferrous oxide which combines with the excess silica in the slag to form a silicate slag. As noted earlier, silica is introduced in the furnace in admixture with the concentrates. An additional amount is added by suitable feeders near the central area of the furnace.

The converting reaction described above, corresponds to the "first-stage blow" in conventional copper converters with the exception that in the present invention a layer of slag exists above the matte at all times. In this respect, the reaction envisaged is identical to the final minutes of a "first-stage blow" when a certain layer of slag is also found on top of the white metal-matte layer.

As a consequence of this reaction between matte and airstream, the former becomes continuously depleted of FeS until at some downstream point, the matte has been converted to white metal ($Cu_2S$).

White metal is then subjected to reaction with air through the tuyeres 5 and the equivalent of the "second-stage blow" of conventional converter operation starts taking place. This part of the reaction is identical to the "second-stage blow", with the exception that a layer of slag exists above the white metal.

In conventional practice, it is highly undesirable to have slag in equilibrium with white metal during the blow, since a relatively large amount of copper finds its way into the slag. However, this aspect of previous practice need not be followed in the present case since at a later stage in the reactor the slag is subjected to a copper-cleaning treatment. Thus, it is of no special consequence if the slag contains for example 1.5 percent Cu or 5—6 percent Cu. Thermodynamic studies have shown that even at equilibrium conditions between metallic copper and highly oxidized slag, the concentration of copper dissolved in the slag does not exceed 6—9 percent Cu.

As the white metal is subjected to interaction with air, it separates into a sulphur-rich and a copper-rich (98—99 percent Cu) phase which has a higher density and therefore precipitates as a third liquid phase toward the copper-settling section Z of the reactor vessel A.

The zone Z of the reactor vessel A is allotted for settling of this copper which is then tapped continuously into one or more small induction furnaces where it can be desulphurized and then deoxidized "on-stream" prior to casting into anodes. The slag layer flows past the copper-smelting zone into the slag-treating zone R where it is subjected to contact with reducing gases as indicated on FIG. 1, which gases are introduced through a series of tuyeres 6. A final slag-settling zone S is provided after the reducing blow, following which the slag is skimmed continuously from the furnace, and sluiced with water. Copper which settles out of the slag flows back into the copper-settling zone Z. As an alternative a separate holding furnace may be provided whereby high copper slag is skimmed from the copper settling zone Z and is reduced by subjecting it to a blow with reducing gases and allowed to settle in order to recover its copper content in the form of a settled high grade matte tapped from the bottom of such holding furnace.

Laboratory and pilot plant experiments conducted at Noranda Research Centre have verified the essential parts of the invention as follows:

a. Smelting-Converting

Copper concentrates were mixed with sufficient silica flux to produce a fayalite (about 30 percent $SiO_2$) slag on conversion. Experiments were conducted in large crucibles and also in a pilot furnace having hearth dimensions of 3 feet wide × 7.5 feet long. In both types of experiments, the blow was interrupted when the three phases (slag, white metal, copper) were found to coexist in the furnace. It is significant to note that white metal and copper were found at the settling end of the furnace, while the ferrous sulphide content of the matte had not been eliminated completely in the charge end of the furnace. Thus, a concentration gradient of FeS existed in the $Cu_2S$ layer according to the requirements of the process.

These tests showed that the separation of the three phases was easily achieved and that the converted copper settles very rapidly out of the white metal, forming a very distinct interface with the latter. The metallic copper contained from 98.6 percent to 99 percent copper.

b. Cleaning of Slag

Tests were conducted in large crucibles by blowing the slag with reducing gas (partially oxidized methane) and allowing the copper to settle out of the slag. Experiments have shown that slags containing 25—30 percent $SiO_2$ and up to 5 percent Cu were cleaned by subjecting them to a blow with carbon monoxide to 0.6 percent Cu after treatment of only 15 minutes. Slag could be cleaned to approximately 0.35 percent after a residence time of 1 hour.

The reducing gases emerging from the slag layer may either be exhausted or burned with air introduced at the slag-reducing zone, to provide an additional source of heat in the settling end of the reactor.

In summary it can be stated that this concept of gradual converting along the axis of a horizontal reaction vessel is new to the copper-smelting field, although it has been utilized in the chemical engineering processes.

For the first time, the various forces affecting movement of slags and mattes (inertial, gravitational, buoyancy, etc.) have been studied and correlated by dimensional analysis in order to predict and control the behaviour of matte and slag in the bath.

The invention therefore presents a significant change in copper-converting which provides for the continuous converting of copper although it effectively separates the first and second blows, by progressive oxidation of the matte stream. In addition, continuous converting produces a steady stream of slag which can be treated in order to decrease its copper content. In the present invention the slag is subjected to a reducing blow and then settling which reduces its copper content to an acceptable and economic level. Thus, the slag can be then discarded, dispensing with the need for a reverberatory furnace. Treatment of the slag can take place either in an appropriate extension of the same furnace or in an adjacent holding furnace. Since the slag can be cleaned to an acceptable copper content by this treatment, the second objection to continuous converting (*i.e.* having the slag above the $Cu_2S$ during the second blow) is overcome.

Clearly this invention represents a major advance in the field of copper-smelting and conversion.

We claim:

1. Apparatus for a continuous process for smelting and converting copper concentrates to metallic copper and cleaning the slag resulting therefrom comprising:
   a. a generally horizontally disposed furnace including a smelting zone, a converting zone and a slag-settling zone;
   b. means for rotating said furnace about its longitudinal axis;
   c. a single charging port formed in said furnace;
   d. means for introducing an oxidizing gas into said furnace;
   e. said means being shaped and dimensioned to ensure the introduction of a volume of oxidizing gas, sufficient to effect gradual oxidation of the matte and subsequent conversion to metallic copper;
   f. a copper-settling section provided in the base area of said furnace;
   g. an area of said furnace remote from said charging port being shaped to form a reducing section for slag resulting from said process;
   h. discharge ports for the resultant copper and slag;
   i. the special sequence of said zones being arranged from the location of the charging port in the order of smelting zone, converting zone and slag-settling zone;
   j. the construction of said zones being such that the matte is permitted to flow concurrently from the smelting zone to the converting zone.

2. Apparatus as claimed in claim 1 wherein said means for introducing an oxidizing gas into said furnace, comprise a plurality of tuyeres arranged along the length of the said furnace.

3. Apparatus as claimed in claim 1 including a separate reducing vessel for cleaning resultant slag to obtain a substantially copper-free slag.

4. Apparatus as claimed in claim 1 including the provision of a burner at the charging end of the said furnace, said burner being adapted to introduce additional heat into the smelting zone of said furnace.

5. Apparatus as claimed in claim 1 including means for providing additional heat in the slag settling zone of the said furnace, said means being in the form of a burner mounted at the slag discharge port of said furnace.

6. Apparatus as claimed in claim 1 including means for providing additional heat in the slag settling zone of said furnace.